Patented May 20, 1941

2,242,322

UNITED STATES PATENT OFFICE 2,242,322

PROCESS FOR PREPARING P-ISOPROPYL-ALPHA-METHYL-HYDROCINNAMIC ALDEHYDE

Louis Poizat, Serezin du Rhone, France, assignor to Societe des Usines Chemiques Rhone-Poulenc, Paris, France, a corporation of France No Drawing. Application June 22, 1938, Serial No. 215,222. In France June 29, 1937

5 Claims. (Cl. 260—599)

This invention relates to a novel process for preparing p-isopropyl-alpha-methyl-hydrocinnamic aldehyde.

It is an object of this invention to provide a novel process for manufacturing said compound whereby to obtain a very pure product having a pure and pleasant odor. It is a further object of this invention to provide a process for manufacturing the above compound which will enable one to employ a technical grade of raw materials without sacrificing the purity of odor in the final product or the possibility of obtaining the same in chemically pure state. Other and further objects of this invention will appear as the description proceeds.

p-Isopropyl-alpha-methyl-hydrocinnamic aldehyde has been described in the literature (U. S. P. 1,844,013 of February 9, 1932) as having a boiling point of 133 to 137° C. under 9 mm. of mercury, and a density of 0.962 at 15° C. The procedure described in the said patent for preparing this aldehyde consists of fixing unto isopropyl-alpha-methyl-cinnamic aldehyde the requisite quantity of hydrogen for saturating the double bond which the latter body contains; the latter body itself is obtainable by condensing cuminic aldehyde with propionic aldehyde.

I have now ascertained that this procedure does not lead to a pure product, for the reason that the hydrogenation of the unsaturated aldehyde does not proceed in an absolutely selective manner; that is, the hydrogen fixes itself not merely upon the ethylinic bond, but sometimes also upon the aldehydic group, transforming the latter into an alcoholic group. On the other hand, part of the initial aldehyde remains unsaturated. As a consequence, the final product contains always beside the desired saturated aldehyde, a variable, though not negligible, proportion of the original unreacted aldehyde and, in some cases, also some of the saturated alcohol corresponding to the saturated aldehyde. These constitute impurities which are practically impossible to eliminate completely. These impurities have a characteristic odor which appears in the final product, whatever be the care which one has taken in purifying it. Beside the fine and flowery odor of linden note, which is characteristic of the saturated pure aldehyde, there is perceived a particularly strong odor of nuts and of dry leaves, due to the unsaturated aldehyde, which becomes more and more intense toward the end of the evaporation. The inevitable presence of these impurities causes the perfume manufacturer practical difficulties; for, as is known, very often the most feeble quantities of odoriferous impurities suffice to modify profoundly the odor as well as the stability of perfume mixtures. I have now found that by adapting an entirely different route it is possible to prepare p-isopropyl-alpha-methyl-hydrocinnamic aldehyde which does not present any of the defects of the product hitherto known under this name.

My novel process consists essentially of transforming into an aldehyde group the carboxylic acid group of p-isopropyl-alpha-methyl-hydrocinnamic acid.

For preparing this, in turn, I preferably employ a procedure which is analogous in its principal features to the well known "Malonic Ester Synthesis." More particularly, I condense cuminyl chloride with the diethyl ester of sodium-methyl-malonic acid. I then saponify the condensation product, acidify and decompose by heating at about 180° C. the di-acid thus obtained. All the phases of this preparation are effected in simple fashion with practically theoretical yields, and lead to p-isopropyl-alpha-methyl-hydrocinnamic acid of extreme purity. This acid constitutes a novel intermediate product, and is of great value for the preparation of p-isopropyl-alpha-methyl-hydrocinnamic aldehyde. It possesses the following characteristics Melting point ____ 38.3° C.
Boiling point ____ 156 to 157° C. under 4 mm. of mercury The further transformation of this acid into the corresponding aldehyde is likewise realized by methods which follow generally the known methods for transforming carboxylic acids into aldehyde. (See for instance, "Catalysis in Organic Chemistry" by Sabatier and Reid, 1923, sections 851 to 854, inclusive, pages 305–6.) One may, for example, heat a mixture of calcium formate and the calcium salt of p-isopropyl-alpha-methyl-hydrocinnamic acid. (Ibid., section 851.) It is preferable, however, to work by a catalytic route for instance, by passing, at convenient temperature, a mixture of the vapors of formic acid and p-isopropyl-alpha-methyl-hydrocinnamic acid over a suitable catalyst, such as the oxide of titanium, of magnesium, of aluminum, of zinc or of thorium. (Ibid., section 852 to 854; also section 539, page 188. See also, Textbook of Organic Chemistry by Bernthsen and Sudborough, revised edition, page 825.)

One obtains thus a very pure p-isopropyl-alpha-methyl-hydrocinnamic aldehyde, of a very pure, flowery olfactory note, and whose physical characteristics are as follows:

Boiling points
- 115° C. under 5 mm. of mercury
- 126 to 127° C. under 9 mm. of mercury Density at 15°__ 0.951

A comparison of the boiling points and of the density indicated above with the constants given in U. S. P. 1,844,013, shows that one deals in the two cases with products of distinct chemical and physical characteristics, independently of the difference which is perceived between their olfactory notes.

Moreover, it is possible to effect in general the above mentioned operations by starting with technical cuminyl chloride, which contains always a certain proportion of the corresponding ortho derivative (o-isopropyl-benzyl chloride). The acid which is obtained as an intermediate product, as well as the final aldehyde, will contain consequently a certain proportion of the corresponding ortho derivatives. If one desires to obtain the p-isopropyl-alpha-methyl-hydrocinnamic aldehyde free from the ortho derivative, the process according to the present invention offers the possibility of arranging matters so that the p-isomer of the intermediate acid is a solid body, easy to separate from the ortho derivative by crystallization. Such a possibility does not exist with the process following U. S. P. 1,844,013, in which the first initial material (cuminic aldehyde) and the unsaturated intermediate aldehyde are both liquid products.

Without limiting my invention to any particular details, the following example is given to illustrate my preferred mode of operation. In this example, my invention is applied to the manufacture of p-isopropyl-alpha-methyl-hydrocinnamic aldehyde from technical cuminyl chloride, resulting in a product which contains a small proportion of the ortho derivative. If applied to pure cuminyl chloride, the procedure is obviously the same. Furthermore, the example below also shows how to obtain a product free from the ortho derivative, if so desired, even though starting with a technical grade of cuminyl chloride. Parts mentioned are by weight.

EXAMPLE

A. *Preparation of p-isopropyl-alpha-methyl-hydrocinnamic acid*

174 parts of diethyl methylmalonate are poured into a 10% alcoholic solution of 68 parts of sodium ethylate. The whole is brought to boiling, and then 168.5 grams of technical cuminyl chloride are run in. When the reaction is finished (disappearance of the alkaline reaction), the mass is heated to boiling for 4 hours with 1200 parts of a 10% caustic soda solution, for the purpose of saponifying the ester obtained. After distilling off the alcohol, the mass is acidified with hydrochloric acid. The cuminyl-methyl-malonic acid obtained is heated to 185° C., until the elimination of carbon dioxide gas has ceased. The product obtained is then rectified under a vacuum. The fraction which has passed between 153 and 157° C. under 4 mm. of mercury is composed of p-isopropyl-alpha-methyl-hydrocinnamic acid containing a small quantity of the ortho derivative. This product is entirely liquid above 29 to 30° C. The yield is 90% of theory.

The reactions involved in the above synthesis may be represented by the following equations:

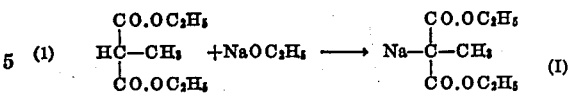

(See Liebig's "Annalen der Chemie," vol. 204, page 121,131).

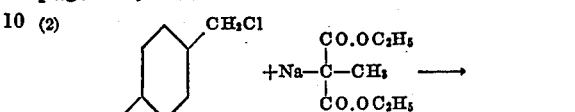

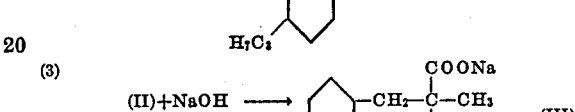

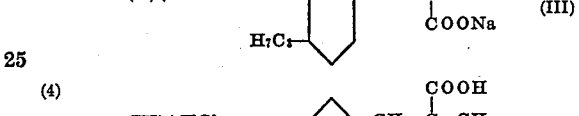

B. *Transformation of p-isopropyl-alpha-methyl-hydrocinnamic acid into the aldehyde*

A tube of "pyrex" glass 50 mm. in diameter and one meter long is filled with a catalyzer which is composed of manganese dioxide supported on granulated pumice. Into this tube, which is heated to 360° C., one passes-in a mixture of the vapors of formic acid and of p-isopropyl-alpha-methyl-hydrocinnamic acid containing approximately 40% of the latter body. The velocity of the gas current is such that it passes approximately 400 grams p-isopropyl-alpha-methyl-hydrocinnamic acid per hour. The product issuing from the furnace contains the formed aldehyde and a small quantity of the non-transformed original acid. By rectification under vacuum, the aldehyde is easily separated from the acid, whose boiling point is much higher. One obtains thus, with a yield of 80%, technical p-isopropyl-alpha-methyl-hydrocinnamic aldehyde, which distills between 118 and 119° C. under 6 mm. of mercury. Its density at 15° C. is 0.954.

The reaction involved in this phase of the process may be represented by the following equation:

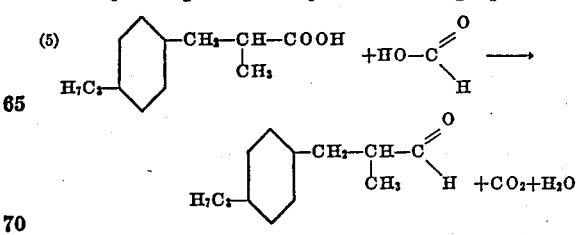

The aldehyde obtained according to this mode of operation possesses a fine and penetrating odor of a linden note, without any accessory odor, and one that remains uniform during its entire evaporation. The product obtained according to U. S. P. 1,844,013, has on the contrary an accessory sharp odor of dry leaves and of nuts, which becomes accentuated during the course of evaporation and masks gradually the initial flowery note.

If one desires to obtain p-isopropyl-alpha-methyl-hydrocinnamic aldehyde free from the ortho derivative, one simply interposes between phases A and B of the above example a purification of the intermediate acid, for example by crystallizing from a small quantity of benzene. The pure p-derivative obtained in this crystallization, when submitted to phase B of the above example, gives p-isopropyl-alpha-methyl-hydrocinnamic aldehyde practically free from the ortho derivative.

In the majority of cases, however, one may dispense with the carrying out of this purification, because while pure p-isopropyl-alpha-methyl-hydrocinnamic aldehyde has a particularly fine and flowery odor, the presence of a small quantity of the corresponding ortho aldehyde does not practically injure the quality of this odor.

It will be understood that many variations may be made in the details of procedure above set forth without departing from the spirit of this invention. For instance, in lieu of cuminyl-chloride any other cuminyl halide may be employed; say, the bromide or iodide. Likewise, in step B of the procedure, the catalyst may be replaced by any other catalyst which is customarily employed in the conversion of carboxylic acids to aldehydes. Nor is the invention limited to the precise proportions and temperatures indicated above, which may be varied within reasonable limits as will be readily apparent to those skilled in the art.

In the claims below the phrase "Malonic Ester Synthesis" shall be understood as referring to the customary type of reaction implied in the art under this name, and involving in general the following steps:

(a) The specified alkyl or aralkyl halide is reacted with a sodium-malonic ester, splitting off sodium halide.

(b) The condensed ester is saponified with alkali and then acidified to give the free di-carboxylic acid of the condensed compound.

(c) The dicarboxylic acid is heated, losing $CO_2$, and resulting in the corresponding monocarboxylic acid.

See for instance, Text Book of Organic Chemistry, by Bernthsen-Sudborough, edition of 1931 at pages 245–6.

I claim:

1. In the process of preparing p-isopropyl-alpha-methyl-hydrocinnamic aldehyde, the step which comprises passing vapors of p-isopropyl-alpha-methyl-hydrocinnamic acid and of formic acid jointly through a catalytic column containing a catalyst of the group adapted to convert a carboxylic acid into an aldehyde.

2. The process of preparing p-isopropyl-alpha-methyl-hydrocinnamic aldehyde, which comprises subjecting a cuminyl halide to Malonic Ester Synthesis with c-sodium-diethyl-methyl-malonate, and further converting the intermediate p-isopropyl-alpha-methyl-hydrocinnamic acid thus obtained into the corresponding aldehyde.

3. The process of preparing p-isopropyl-alpha-methyl-hydrocinnamic acid, which comprises subjecting a cuminyl halide to the Malonic Ester Synthesis with a lower alkyl ester of sodium-methyl-malonic acid.

4. The process of preparing p-isopropyl-alpha-methyl-hydrocinnamic acid which comprises reacting cuminyl chloride with the diethyl ester of sodium-methyl-malonic acid, hydrolyzing the resulting cuminyl-methyl-diethyl-malonic ester, acidifying, and heating the diacid thus formed to split off carbon dioxide.

5. The process of preparing p-isopropyl-alpha-methyl-hydrocinnamic aldehyde, which comprises reacting a cuminyl halide with a di-(lower alkyl) ester of C-sodium-C-methyl-malonic acid, hydrolyzing the resulting cuminyl-methyl-dialkyl-malonic ester, acidifying, heating the diacid thus formed to split off carbon dioxide, and further converting the intermediate p-isopropyl-alpha-methyl-hydrocinnamic acid thus obtained into the corresponding aldehyde.

LOUIS POIZAT.